(12) United States Patent
Thompson et al.

(10) Patent No.: US 8,490,157 B2
(45) Date of Patent: Jul. 16, 2013

(54) AUTHENTICATION—CIRCLES OF TRUST

(75) Inventors: Peter B. Thompson, Redmond, WA (US); Ian M. Sands, Seattle, WA (US); Ali M. Vassigh, Redmond, WA (US); Eric I-Chao Chang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1131 days.

(21) Appl. No.: 12/393,705

(22) Filed: Feb. 26, 2009

(65) Prior Publication Data
US 2010/0107219 A1    Apr. 29, 2010

Related U.S. Application Data

(60) Provisional application No. 61/109,440, filed on Oct. 29, 2008.

(51) Int. Cl.
*H04L 9/32* (2006.01)

(52) U.S. Cl.
USPC ..................... 726/2; 726/30; 726/4

(58) Field of Classification Search
USPC .................. 726/2, 30, 4
See application file for complete search history.

(56) References Cited

U.S. PATENT DOCUMENTS

| | | | |
|---|---|---|---|
| 6,504,956 B1 | 1/2003 | Gannage | |
| 7,262,764 B2 | 8/2007 | Wang | |
| 7,716,469 B2 * | 5/2010 | Bhatnagar et al. | 713/156 |
| 7,784,085 B2 * | 8/2010 | Le Van Gong et al. | 726/3 |
| 8,024,185 B2 * | 9/2011 | Do et al. | 704/235 |
| 2004/0230893 A1 | 11/2004 | Elza et al. | |
| 2005/0091316 A1 | 4/2005 | Ponce et al. | |
| 2006/0078866 A1 | 4/2006 | Marggraff et al. | |
| 2006/0084393 A1 | 4/2006 | Engstrom | |
| 2006/0085373 A1 * | 4/2006 | Dhillion et al. | 707/1 |
| 2006/0173963 A1 * | 8/2006 | Roseway et al. | 709/206 |
| 2006/0253706 A1 * | 11/2006 | Roberts et al. | 713/168 |
| 2006/0294247 A1 | 12/2006 | Hinckley | |
| 2007/0143128 A1 * | 6/2007 | Tokarev et al. | 705/1 |
| 2008/0001929 A1 | 1/2008 | Wulff | |
| 2008/0172464 A1 | 7/2008 | Thattai et al. | |
| 2008/0183703 A1 | 7/2008 | Agrawal et al. | |
| 2009/0094561 A1 * | 4/2009 | Do et al. | 715/863 |

(Continued)

FOREIGN PATENT DOCUMENTS

KR    20070104309 A    10/2007

OTHER PUBLICATIONS

Wilson, Andrew D. and Raman Sarin, "BlueTable: Connecting Wireless Mobile Devices on Interactive Surfaces using Vision-based Handshaking." [http://research.microsoft.com/~awilson/papers/GI%202007.pdf] Retrieved online Sep. 4, 2008.

(Continued)

*Primary Examiner* — Kambiz Zand
*Assistant Examiner* — Aubrey Wyszynski
(74) *Attorney, Agent, or Firm* — Lee & Hayes, PLLC

(57) ABSTRACT

Within a surface computing environment users are provided a seamless and intuitive manner of modifying security levels associated with information. If a modification is to be made the user can perceive the modifications and the result of such modifications, such as on a display. When information is rendered within the surface computing environment and a condition changes, the user can quickly have that information concealed in order to mitigate unauthorized access to the information.

20 Claims, 16 Drawing Sheets

U.S. PATENT DOCUMENTS

2009/0106667 A1* 4/2009 Lyle et al. ............... 715/750
2009/0193526 A1* 7/2009 Sweazey ................. 726/30
2010/0045567 A1* 2/2010 Lin ........................ 345/1.1

OTHER PUBLICATIONS

Ricci, R., et al., "SecurePhone: A Mobile Phone with Biometric Authentication and e-Signature Support for Dealing Secure Transactions on the Fly" [http://64.233.183.104/search?q=cache:8CpDKWpO9jYJ:www.hf.ntnu.no/isk/koreman/Publications/2006/SPIE33_SPoverview.doc+authenticate+surface+and+mobile+device+interaction&hl=en&ct=clnk&cd=39&gl=uk] Retreived online Sep. 4, 2008.

Magerkurth, Carsten and Peter Tandler, "Interactive Walls and Handheld Devices—Applications for a Smart Environment." [http://www.ipsi.fraunhofer.de/ambiente/paper/2002/UbiComp02-Magerkurth.pdf] Retrieved online Sep. 4, 2008.

Berger, Stefan, et al., "Using Symbiotic Displays to View Sensitive Information in Public." [http://ieeexplore.ieee.org/iel5/9592/30312/01392750.pdf] Retrieved online Sep. 4, 2008.

Narayanaswami, Chandra, "Form Factors for Mobile Computing and Device Symbiosis." [http://ieeexplore.ieee.org/iel5/10526/33307/01575565.pdf?tp=&isnumber=&arnumber=1575565] Retrieved online Sep. 4, 2008.

Hiemstra, Glen, "iPhones, Surface Computing—A New Way" [http://www.futurist.com/2007/07/03/iphones-surface-computing-a-new-way/] Retrieved online Sep. 4, 2008.

Dohse, K.C., et al., "Enhancing Multi-User Interaction with Multi-Touch Tabletop Displays using Hand Tracking" [http://www.ieeexplore.ieee.org/iel5/4455942/4455943/04455997.pdf?tp=&isnumber=4455943&arnumber=4455997] Retrieved online Sep. 4, 2008.

Chinese Office Action mailed Mar. 29, 2013 for Chinese patent application No. 200980144149.4, a counterpart foreign application of U.S. Appl. No. 12/393,705, 10 pages.

* cited by examiner

AUTHENTICATION—CIRCLES OF TRUST

CROSS-REFERENCE

This application claims the benefit of U.S. Provisional Application Ser. No. 61/109,440, filed Oct. 29, 2008, entitled "Authentication—Circles Of Trust," assigned to the assignee hereof and the entirety of which is incorporated herein by reference.

BACKGROUND

Computing devices are utilized by virtually everyone and in many different types of contexts (e.g., personal, social, professional, and so on). For example, it is common to see people communicating (e.g., telephone calls, text messages, emails, data transfer, and so forth) no matter where that person might be located (e.g., in a supermarket, in a library, taking public transportation, and so forth). As technology advances, so does the speed of communications and the demand for increased computing power. Further, data can be transferred across the country or across the globe in a matter of seconds. Based on the increased demands for computing capabilities, people are requiring more and more resources to be available for communicating electronically, whether the communication is with friends, family, coworkers, or others.

Computing technology has evolved such that touch screens and other devices (e.g., cameras) can track a user's movements and make intelligent decisions regarding those movements. It has also become more commonplace for users to share a single computing environment and work together and/or separately within that computing environment.

Since the demand for electronic computing devices is at an all time high, it is important to provide users with any time, anywhere computing capabilities. However, concerns can arise as it relates to security and confidentiality in such computing environments, especially when others within the computing environment can obtain access to the data. Such concerns relate to protecting a user's identity, protecting information associated with the user, protecting data found in the user's device, and so forth.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with creating levels of security in a surface computing environment. Various aspects relate to selectively controlling information that is allowed to be shared in a collaborative environment. Thus, people within the environment can collaborate on certain things, but not with everything. For example, some information contained in a user's device can be automatically shared while other information contained in the user's device is not shared.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1:
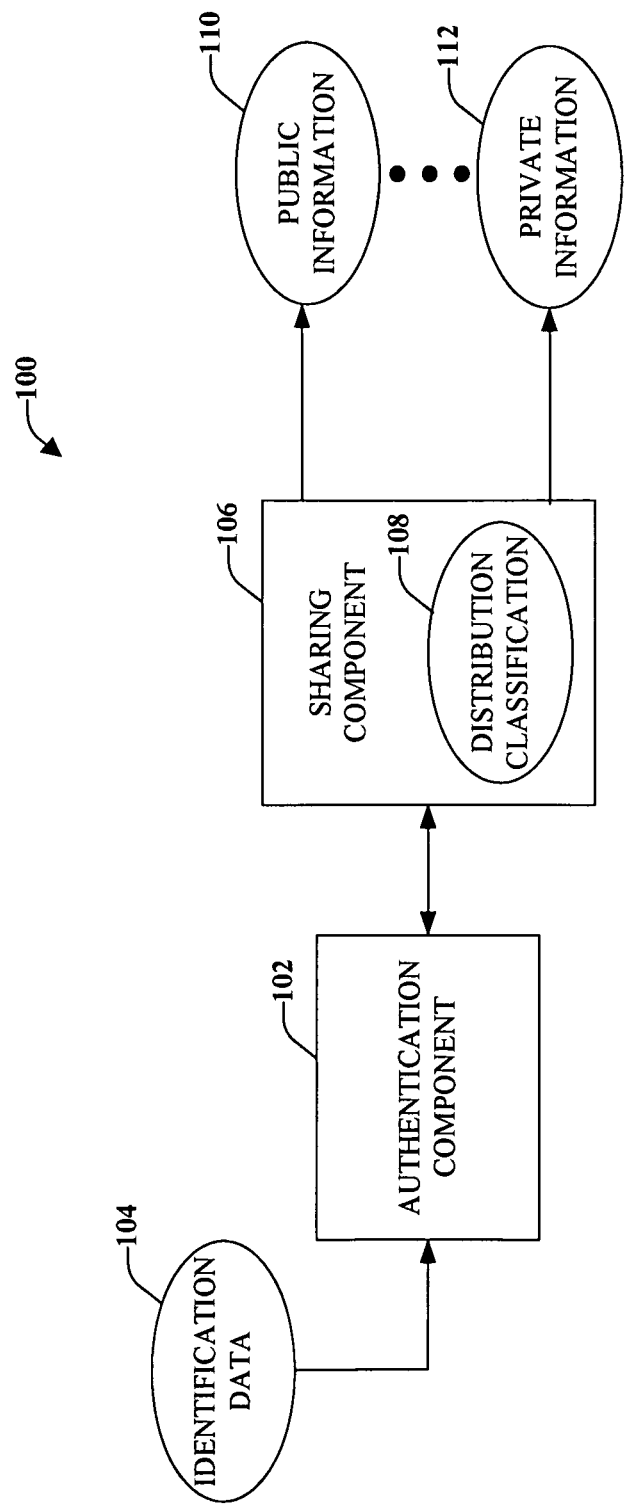
FIG. 1 illustrates a system that facilitates selective sharing of information in a surface computing environment, according to an aspect.

Referring initially to FIG. 1, illustrated is a system 100 that facilitates selective sharing of information in a surface computing environment, according to an aspect. As the trend moves to using any surface (e.g., table, wall, and so forth) as a display, various scenarios can develop that might impact the control of personal or confidential information. For example, if a tabletop becomes a computing surface, as laptops or other mobile devices are placed on that surface, the control of how information is transferred from the device to the surface (e.g., manually by the user, automatically, or combinations thereof) is important. System 100 is configured to selectively control the information that is allowed to be shared (e.g., transferred from the device to the surface) in a collaborative surface computing environment. Thus, system 100 automatically, or through user interaction, classifies information (or a subset of the information) with different levels or degrees of confidentiality by asking the question whether the user wants to do something that is personal or do something that allows the user to share and interact with others. System 100 can automatically answer the question based on an inference of what the user might want to do and/or can request (solicit) input from a user. For example, if an entire table arrangement is interactive, as people arrive with their mobile devices it can affect the way these people work because of the interactivity. Each individual might want to collaborate on certain things contained in their mobile device, but not with everything contained in their mobile device. Thus, the surface can be forced to change characteristics based on the desires of each user.

System 100 includes an authentication component 102 that identifies a user based on an interaction with the surface computing environment. The interaction can be triggered by various actions that convey identification data 104 to authentication component 102. For example, identification data 104 can be directly input by the user in a user interface. Such identification data 104 can include a user name/password pair or other identification information (e.g., email alias, screen name, security code, and so forth).

Additionally or alternatively, the identification data 104 can be received from an object associated with the user. For example, the object can be a key fob, wherein the user places the key fob within the surface computing environment (or directly in contact with surface computing equipment, such as a tabletop display). In another example, a mobile device can be placed within the surface computing environment (or directly in contact with one or more pieces of surface computing equipment). Based on information gathered from the object, the user can be automatically identified, provided the user has authorized such automatic identification.

In another example, objects that include a Radio Frequency Identification (RFID) or other means of detection can provide the identification data 104. For example, authentication component 102 can receive the RFID (or other) data when the user enters the area or when the user passes the RFID tag over a receiver unit that is configured to receive and identify the RFID tag.

In accordance with some aspects, the identification data 104 can be biometrics (e.g., fingerprint, thumbprint, retina scan, and so forth) that were previously gathered from the user and accessible to authentication component 102. Gathering of the biometric data should be approved by the user prior to any collection and/or retention of the biometric data. For example, when a user enters the vicinity of system 100 (e.g., walks into the room), authentication component 102 can detect the identity of the user through face recognition (e.g., by employing a camera), or though other physical biometrics (e.g., eye scan, fingerprint, and so on).

The identification data 104 can be previously gathered by authentication component 102 and matched to a particular person when that same identification information 104 is presented for user authentication. According to some aspects, to match the user to the identification data 104, authentication component 102 gathers the appropriate information from a remote source (e.g., from a remote server, from a database, over the internet, and so forth). For example, authentication component 102 can convey the identification data 104 to an external source that responds with the user identification information, if available.

According to various aspects, more than one piece of identification data 104 should be received by authentication component 102 in order to identify the user. The presence of multiple identification data 104 might be desired in various circumstances depending on the task being performed by the user and/or a security level associated with data. For example, multiple forms of user identification data 104 (e.g., a hotel room key and a piece of biometric data) might be needed when purchasing items, when charging products to a hotel room, when joining a private surface computing environment, and so forth.

In accordance with some aspects, the identity of the user is not verified by authentication component 102. Thus, authentication component 102 can provide the user an option of authenticating with system 100. For example, the user can be presented with a prompt asking if the user would like to authenticate or log onto system 100. The user can decide whether to authenticate or to remain anonymous. If the user chooses to remain anonymous, the user can still access one or more resources available in the surface computing environment, according to an aspect.

In accordance with the aspects that allow the user to be automatically identified and authenticated (based on prior user approval), the user is able to quickly become immersed in the surface computing environment without needing to perform administrative types of activities (e.g., answering a prompt to authenticate, providing identification information 104, and so on). However, if the user is automatically identified and authenticated (for convenience to the user), the user should remain in control of the information that is shared within the surface computing environment in the same manner that the user controls the sharing of information when the user manually authenticates with system 100.

Also included in system 100 is a sharing component 106 that is configured to reveal a subset of information within the surface computing environment. The subset of information can be data revealed to the user (e.g., information from other users within the remote computing environment) and/or can be information that the user wishes to reveal to others within the remote computing environment.

The subset of information revealed can be a function of the user identification 104 and a distribution classification 108. Although the distribution classification 108 is illustrated as contained within sharing component 106, distribution classification 108 can be maintained separate from and accessible by, sharing component 106. The distribution classification 108 can be thought of as circles of trust, which is the idea that, when in a public computing environment, especially in surface computing scenarios, levels of trust range from retaining anonymous interaction with system 100 (e.g., not authenticating with system 100) to being identified by system 100 and consuming and/or allowing others to consume certain information.

There can be numerous distribution classifications 108, which are based on confidentiality levels established by the user, automatically assigned as a function of inferred data, or combinations thereof. The distribution classifications 108 can mitigate invasion of privacy concerns by allowing the user to create, modify, delete, and so forth, the information (or a subset of the information) in each distribution classification 108. For example, a user might desire that certain information be revealed when that user authenticates with system 100.

Based on the distribution classification 108, information associated with the user can be identified as public information 110, private information 112, or any identification there between. The public information 110 can be shared with others within the surface computing environment while the private information 112 is not shared with others or is shared with only a subset of others within the surface computing environment. If certain information is marked as private information 112, when a device is placed within the surface computing environment, the private information 112 is not transferred to the surface equipment (e.g., display). However, information that is marked as public information 110 can be readily shared with others. System 100 allows the user to clearly define and identify whether information is marked as public, private, or any state there between. A simple aspect that allows for such intuitive and ease of understanding is through utilization of circles (or levels) of trust, wherein information can be moved from one level or circle to another in an intuitive manner. Additional information related to circles of trust is provided below.

Further, system 100 is enabled to allow users within the surface computing environment to feel secure about sharing information. This can be facilitated by creating a new session each time a user authenticates (or selectively does not authenticate) with system 100. After completion of that session, any residual information local to system 100 (e.g., retained in memory or a storage media) is automatically removed.

In accordance with some aspects, the surface computing environment can operate similar to a white board. For example, the information is available on the surface and people can view the information, engage with the information, and so on. Once the session is completed or if another indication is received from the user to remove the information, the information is removed from the surface and from any memory or other storage medium that might be associated with the surface computing environment. The completion of the session can be indicated by the user logging off the system 100, inactivity for longer than a threshold period of time, detection that the user is no longer within the environment, and so forth.

For example, a user desires to share information with a friend within the surface computing environment and, in order to facilitate the sharing of information, the user places his mobile device on the surface computing equipment and data transfer between the user's device and the friend's device occurs. The surface computing equipment is configured to allow this sharing (or transfer) of information, however, the surface equipment does not maintain the information that is being transferred between the user's device and the friend's device.

Figure 2:
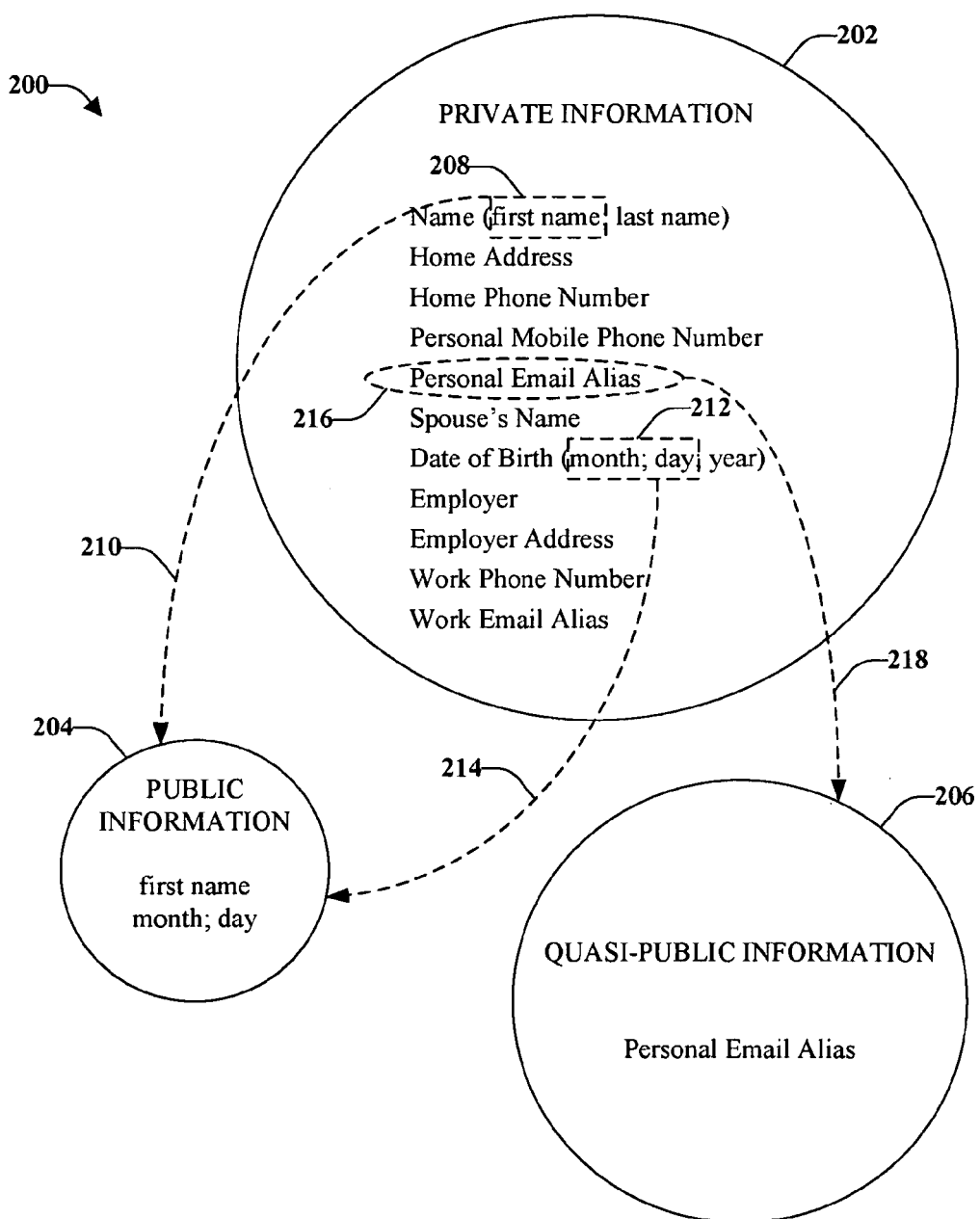
FIG. 2 illustrates a schematic representation of levels of trust in accordance with one or more of the disclosed aspects.

FIG. 2 illustrates a schematic representation of levels of trust 200 in accordance with one or more of the disclosed aspects. The levels of trust 200 represent distribution classifications. These varying levels of trust 200 can provide a seamless user experience that allows the user to visually understand the different types of relationships the user can have with the different people in the surface computing environment, which can be a collaborative environment (e.g., work, hotel, coffee shop, restaurant, library, store, and so forth).

There can be multiple levels of trust 200, however, only three levels are illustrated for purposes of simplicity. Illustrated is a level for private information 202, a level for public information 204, and a level for quasi-public information 206, which can be a shared workspace, for example.

The private information level 202 can contain all information known about the user, identification of the user, data associated with the user (e.g., pictures, documents, music, spreadsheets, and so forth), and/or information the user does not desire to share with others. Such information can be contained in the user device, retained by the surface computing environment (if enabled with retention capabilities and authorized by the user), accessible from a remote source (e.g., Internet), and so forth. If a user does not choose to authenticate with the surface computing environment and/or prior to authentication, all information associated with the user (and user device) is contained within the private information level 202 (e.g., no information related to the user is communicated with the surface computing environment).

The public information level 204 includes information that the user desires to share with others in the surface computing environment. The quasi-public information level 206 includes the information that the user would like to share with selected individuals in the surface computing environment. The selected individuals can be specifically identified (e.g., based on name, email alias, device identification, and so forth) or can be specified based on other criteria (e.g., others that have read a particular book, others that share a common interest or goal, and so forth).

For example, in a library or bookstore people can leave information about a particular book (e.g., comments, likes, dislikes, overview, and so forth). When another person selects the book (e.g., pulls the book off the shelf, places the book on a table, and so on), the book is recognized (e.g., RFID tag, image recognition, and so on). At substantially the same time as the book is recognized, the associated information is presented based on some connection or commonality with the person that left the information (e.g., both people are interested in the book). If an identity is associated with the person that left the comment (e.g., librarian name, employee at the book store), the person being presented with the information can have some background related to that information (e.g., "I never agree with this librarian", "This employee always suggests good books", and so on).

After a user has been identified or authenticated, a subset of information from the private information level 202 can be automatically moved to the public information level 204 and/or the quasi-public information level 206 (and/or one or more other designations).

In accordance with some aspects, information (or a subset of information) can be moved among the levels by the user manually. For example, the user can choose a subset of information (such as by drawing a box around the information) and drag (e.g., with a mouse device or other pointing device) that information to a different circle or level of trust. Thus, the user can select the information that is to be consumed (or not consumed) in the surface computing environment.

By way of example and not limitation, various information can be associated with a user, such as the following information:

Name (first name; last name)
Home Address
Home Phone Number
Personal Mobile Phone Number
Personal Email Alias
Spouse's Name
Date of Birth (month; day; year)
Employer
Employer Address
Work Phone Number
Work Email Alias It should be noted that the information in the above list is for purposes of explanation only and different information can be utilized, in accordance with the various aspects. The list is simply generic information and is provided to describe some of the aspects disclosed herein. The information contained in the above list can be automatically placed in the private information level 202 due to the sensitivity of the data. In accordance with some aspects, all information (e.g., documents, pictures, and so forth) is initially placed in the private information level 202 until the user manually changes the information level in order to selectively share information.

As desired, a user can move a subset of information to a different security level. Using the above example list of information, each user might desire that some information can be revealed, that some information should never be revealed, and/or that some information should be revealed only to selected or authorized individuals. For example, the user can select "First Name" 208 and move that subset of information, illustrated at 210, to a different circle of trust, such as to the public information level 204. The user can also select another subset of information, such as month/day of birth 212 (but not year, in this example) and move that subset of information, illustrated at 214, to the public information level 204. Further, a selection of "Personal Email Alias" 216 can be made and moved, at 218, to the quasi-public circle of trust 206, such that only a select group of individuals can receive that information 216.

Thus, the user is provided a mechanism for interacting with the disclosed aspects and viewing the information and the security level (e.g., distribution classification) for the information. If the user desires to change the security level, the user can perceive the changes as they are being made and can perceive the result of the actions. If a mistake is made, the user can selectively undo and/or change a security level associated with one or more subsets of information.

Figure 3:
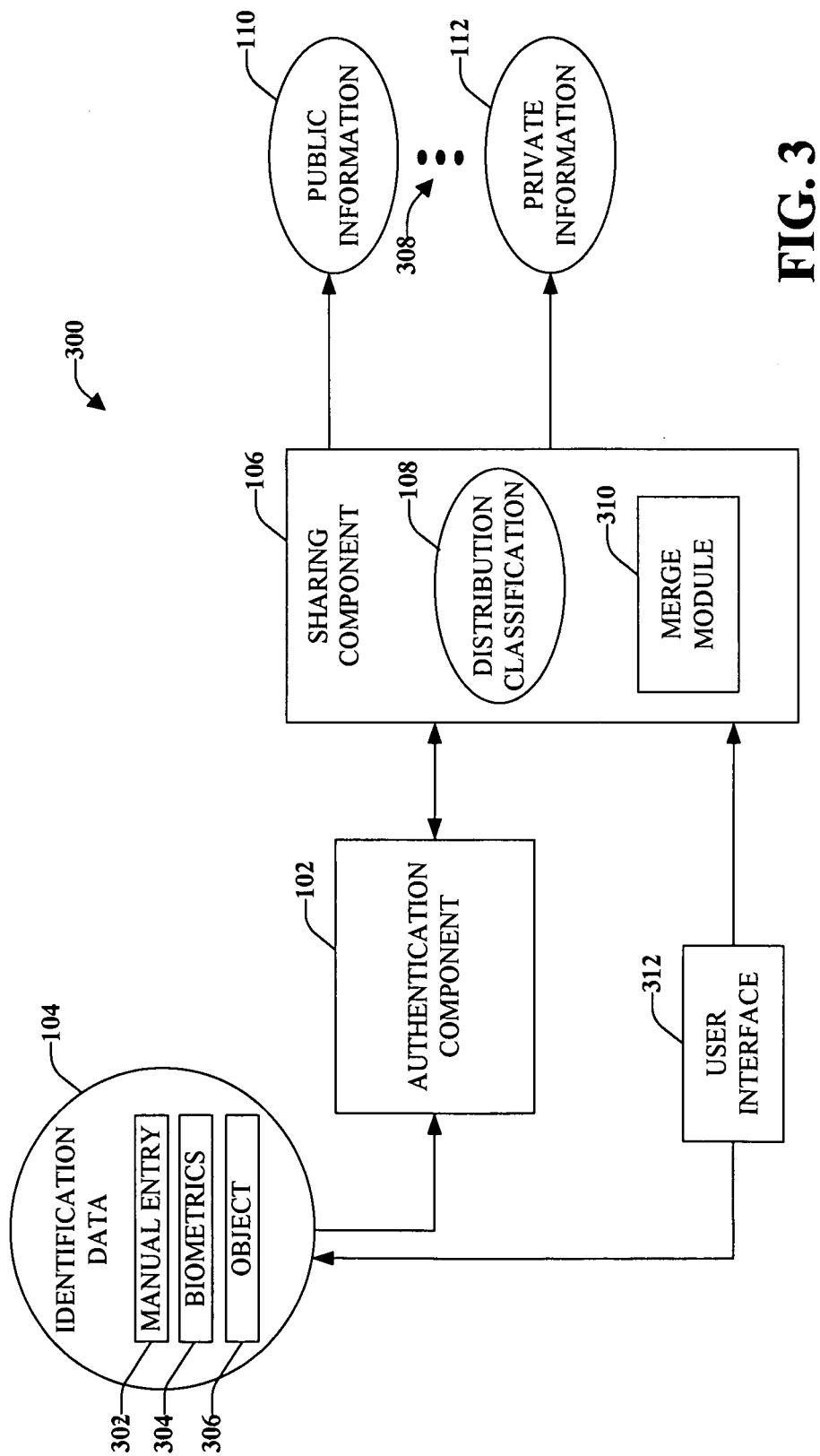
FIG. 3 illustrates a system for use in a surface computing environment for selectively sharing information among users in accordance with one or more of the disclosed aspects.

FIG. 3 illustrates a system 300 for use in a surface computing environment for selectively sharing information among users in accordance with one or more of the disclosed aspects. System 300 allows a user to manipulate distribution classifications (circles of trusts, security levels), temporarily or permanently through interaction with the surface computing environment.

System 300 includes an authentication component 102 that allows a user to selectively register or be identified with system 300. The user can be provided a prompt asking whether the user would like to log in and authenticate with system 300, whether the user would like to just be recognized by name, or whether the user does not want to be identified at all by the system 300 (e.g., remain anonymous). For example, the user might choose to remain anonymous but leverage some of the services offered in the surface computing environment, such as Internet access or to gain basic access, such as access to order a coffee and a donut through interaction with the surface computing environment. Thus, in accordance with some aspects, the user is able to utilize the system 300, but the system 300 is not personalized for that particular user.

If the user desires to be identified, the identification can be based on an interaction with the surface computing environment, such as a manual entry 302 of data, a biometric input 304, presence of an object 306, or combinations thereof. The manual entry 302 can include data assigned to the user, selected by the user, or associated with the user in some other manner. Examples of data 302 that can be manually entered include a user name, an email alias, an employee identification number, a user name/password pair, a Personal Identification Number (PIN), an authorization code/name, and so forth.

Biometric input 304 can include fingerprints, thumbprints, retina scan, face recognition, iris recognition, hand geometry, voice recognition, or other biometric data (physiological, behavioral, and so forth). The user should have full knowledge of the collection of biometric data and approve the collection/use of the biometric data. It should be understood that biometric input 304 is not retained by the surface computing environment but instead would be retained by the user's device or by a remote trusted third party. In such a manner, unauthorized access by others that have access to the surface computing environment is mitigated.

Presence of an object 306 can indicate that the user associated with the object is within (or near) the surface computing environment. The object can be any item and/or device that can provide identification of the user, either alone or in combination with other forms of identification data 104. For example, the object can be a mobile device (e.g., mobile phone, laptop, and so forth), an item with an RFID tag, and so forth.

Authentication component 102 can communicate with a sharing component 106 that selectively presents information to users within the surface computing environment based on one or more distribution classifications 108. The distributions classifications can place information within classifications (e.g., circles of trust) based on the confidentiality of the information, how personal that information is to the user, based on how that user (or other users) have classified the same (or similar data), and so on. A subset of the information available for sharing can be classified as public information 110, private information 112, or classifications there between (as indicated by the ellipses at 308). For example, a subset of information can be considered quasi-public, wherein a select group of individuals are allowed to view some information, which is not available to everyone. The select group of individuals can be specifically identified, can be dynamically selected, or can be identified though other manners (e.g., common interests, common goals, and so forth).

System 300 can also include a merge module 310 that is configured to selectively move or reclassify a segment of data with the distribution classification 108. The data can be moved from a first distribution classification to a second distribution classification manually by the user (as discussed above with reference to FIG. 2) and/or automatically by system 300 (e.g., based on the identification (or lack of identification) of others within the surface computing environment). For example, a segment of data can be reclassified from public information 110 to quasi-public information or from private information 112 to public information 110, and so forth.

The user can interact with authentication component 102, sharing component 106, and/or merge module through a user interface 312. The user interface 312 can provide a graphical user interface (GUI), a command line interface, a speech interface, Natural Language text interface, and so forth. For example, a GUI can be rendered that provides a user with a region or means to load, import, select, read, identification information and/or distribution classifications, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance (such as vertical and/or horizontal scroll bars for navigation and toolbar buttons to determine whether a region will be viewable) can be employed. For example, the user can interact with system 300 by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
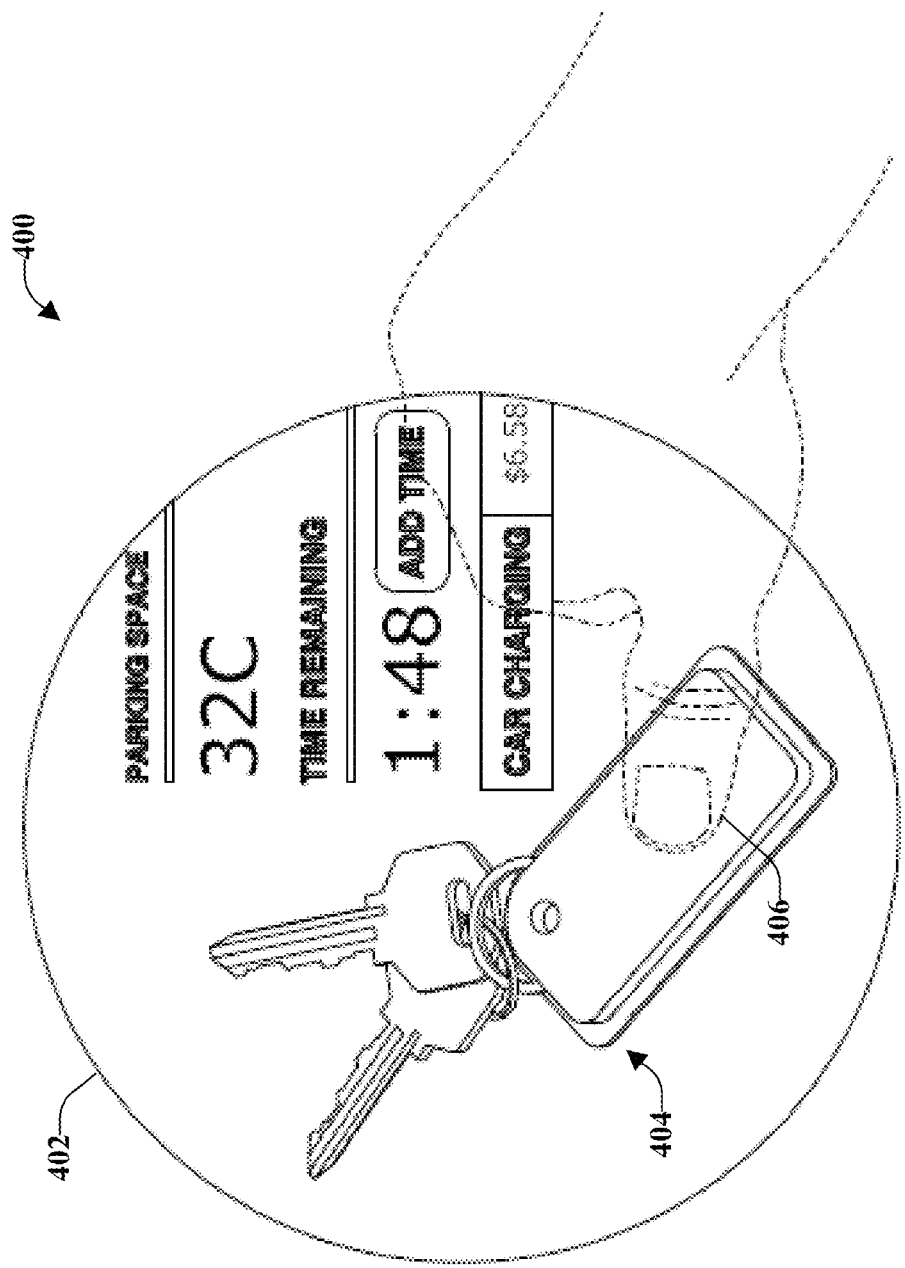
FIG. 4 illustrates a schematic representation of a user authenticating in a surface computing environment.

In order to fully appreciate the disclosed aspects, FIG. 4 illustrates a schematic representation 400 of a user authenticating in a surface computing environment. As illustrated, a user can be presented with a circle of trust 402 that includes information, such as the illustrated information associated with a parking space. A user can place keys and a key fob 404 directly on the surface table or within the circle of trust 402. In accordance with some aspects, a user can authenticate though the use of biometrics, such as through utilization of a thumbprint 406. The thumbprint 406 or key fob information 404, also referred to as identification data (104), can be received by an authentication component (102) to allow the user to be automatically identified based on the interaction with the surface computing environment.

It should be appreciated that although authentication is illustrated by the presence of an object (e.g., key fob 404) and/or a biometric input (e.g., thumbprint 406), other means of authentication can be utilized with the disclosed aspects. For example, a manual entry (e.g., entering a user identification/password pair) can be utilized. Additionally or alternatively, the user can be automatically authenticated, such as through facial recognition, presence of an object with an RFID tag, or through other means.

In accordance with some aspects, the user might choose not to authenticate with the surface computing environment. In accordance with these aspects, the user can remain anonymous. Some computing environments can allow the user to leverage various aspects of the surface computing environment while remaining anonymous (e.g., order a beverage, gain Internet access, and so forth).

Figure 5:
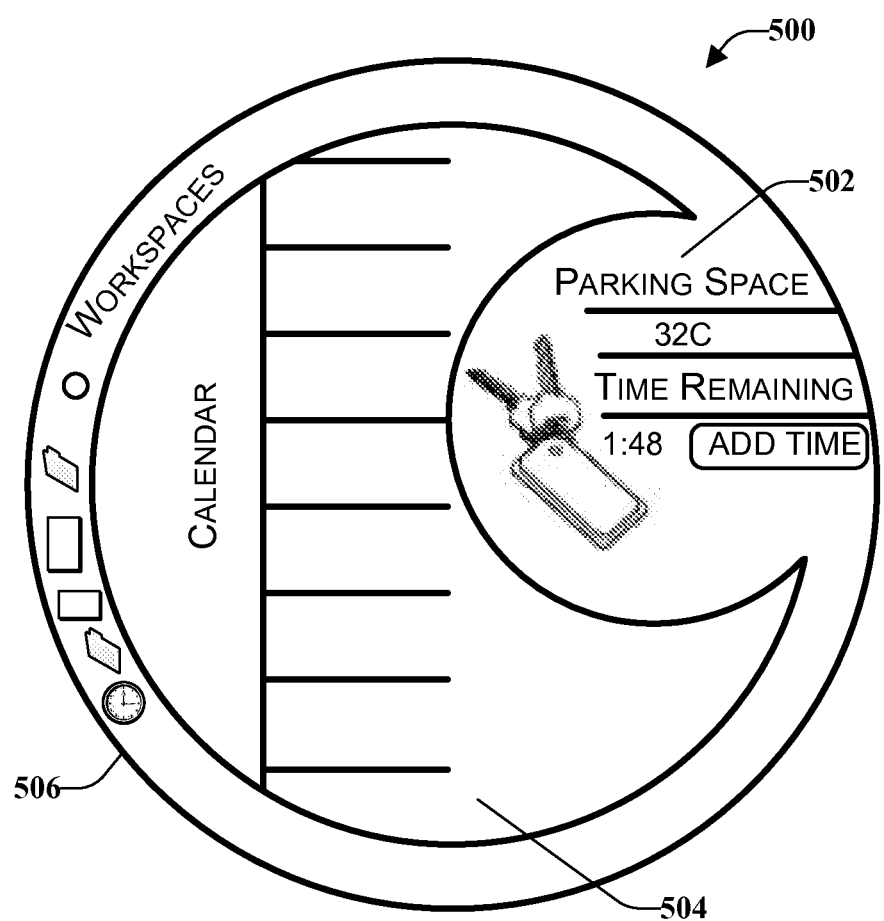
FIG. 5 illustrates a schematic representation of circles of trust that includes personal information.

FIG. 5 illustrates a schematic representation 500 of circles of trust that includes personal information. A first circle of trust 502 can include parking information. A second circle of trust 504 can include calendar information. A third circle of trust 506 can include workspace information, which provides the user with other options. It should be appreciated that any number of circles of trust can be utilized with the disclosed aspects.

Figure 6:
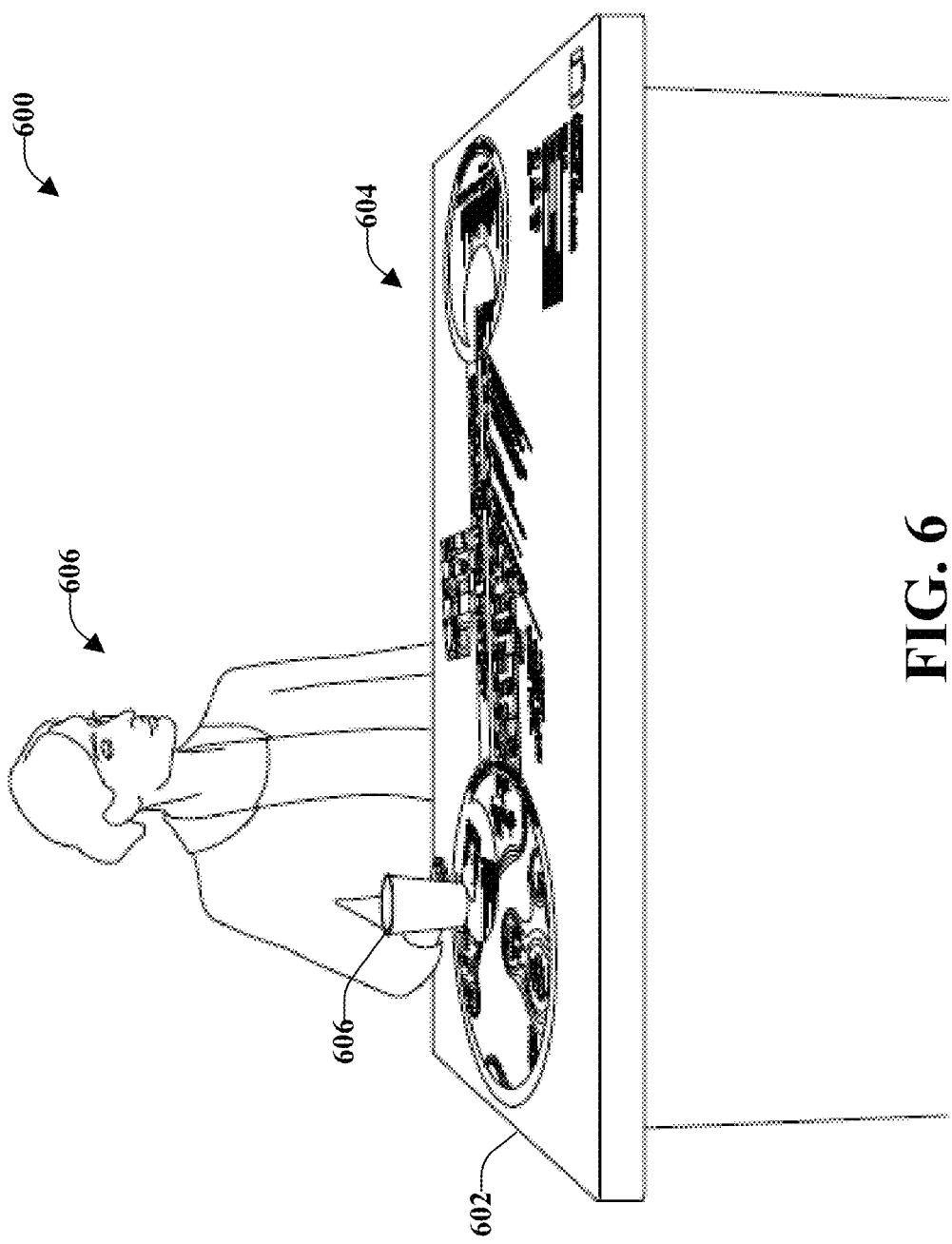
FIG. 6 illustrates a schematic representation of a surface computing environment according to various aspects presented herein.

FIG. 6 illustrates a schematic representation of a surface computing environment 600 according to various aspects presented herein. The surface computing environment 600 includes a table (or desk) 602 that provides a surface display 604. One or more users 606 can interact with the surface display 604 in order to communicate information utilizing authentication and circles of trust as disclosed herein. As illustrated, the table 602 can be utilized as a surface display 604 and, at the same time, as a traditional table (e.g., coffee cup 606 can be placed on table 602). The surface display 604 can provide various levels of trust, wherein some levels of trust are associated with respective users and other levels of trust are shared among users.

Figure 7:
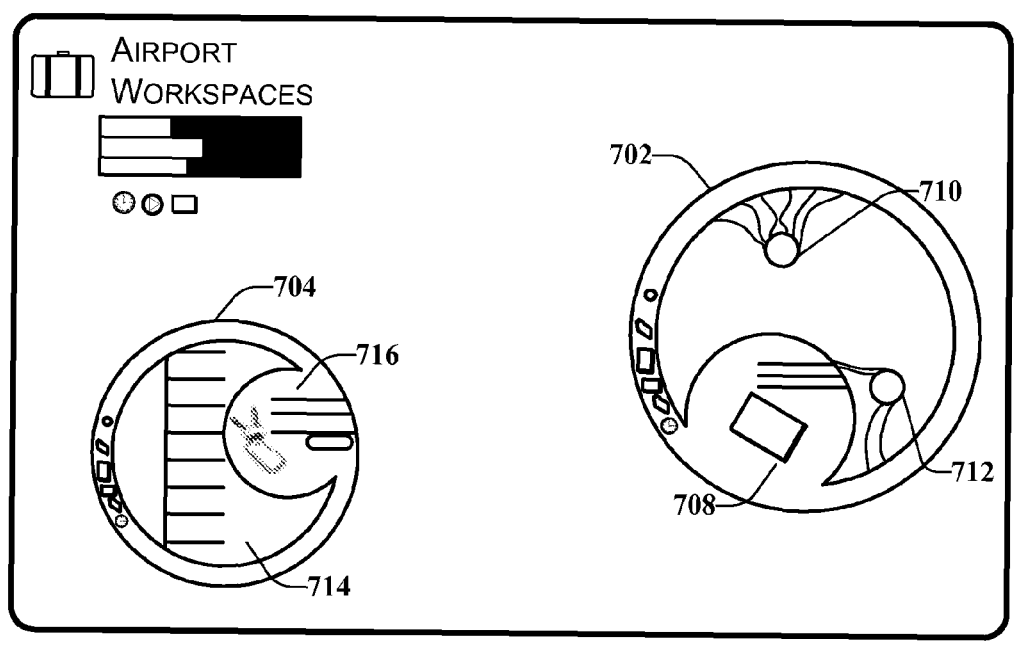
FIG. 7 illustrates a representative screen shot of circles of trust in accordance with various aspects.

FIG. 7 illustrates a representative screen shot of circles of trust 700 in accordance with various aspects. A first circle of trust 702 can be associated with a first user (such as user 606 of FIG. 6). A second circle of trust 704 can be associated with a second user. Information contained in each circle of trust 702, 704 can be information associated with the specific user or owner of that circle of trust 702, 704. For example, the first circle of trust 702 includes information associated with a first user, such as travel information, which is contained in a travel information circle of trust 708. The first circle of trust 702 is further divided into other categories or circles of trust, a few of which are labeled at 710 and 712. In a similar manner, the second circle of trust 704 (associated with a second user) contains one or more circles of trust, labeled at 714 and 716.

Subsets of information in the mini-circles of trust 708, 710, 712, 714, 716 within each user's circle of trust 702, 704 can be selectively moved between the mini-circles of trust 708-716. For example, the user can move a segment of information from a first circle of trust (such as circle of trust 712) to a second circle of trust (such as circle of trust 710). Based on this manual input, a merge module (310) can reclassify the selected segment of information with the new circle of trust (e.g., circle of trust 710).

Figure 8:
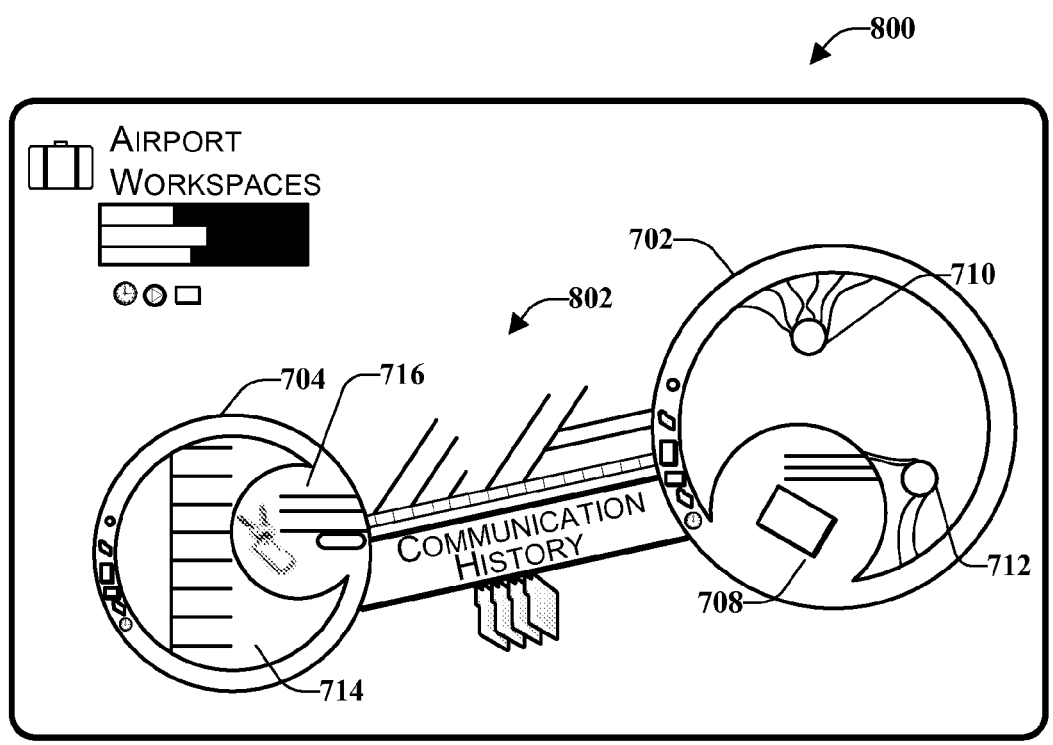
FIG. 8 illustrates another representative screen shot of circles of trust wherein two or more users are communicating information in accordance with the various aspects.

FIG. 8 illustrates another representative screen shot 800 of circles of trust wherein two or more users are communicating information in accordance with the various aspects. The two circles of trust 702 and 704 can be displayed on a single surface computing environment, such as a table.

A sharing component can be utilized to reveal a subset of information within the surfacing computing environment

800. Each circle 702 and 704 can remain private to each respective user while some information, illustrated at 802 is shared. This sharing can be graphically illustrated to allow the users to visualize the information that is being shared. In an example, a merge module can reclassify the shared data 802 as public information or quasi-public information at substantially the same time as the information is shared, at 802.

Figure 9:
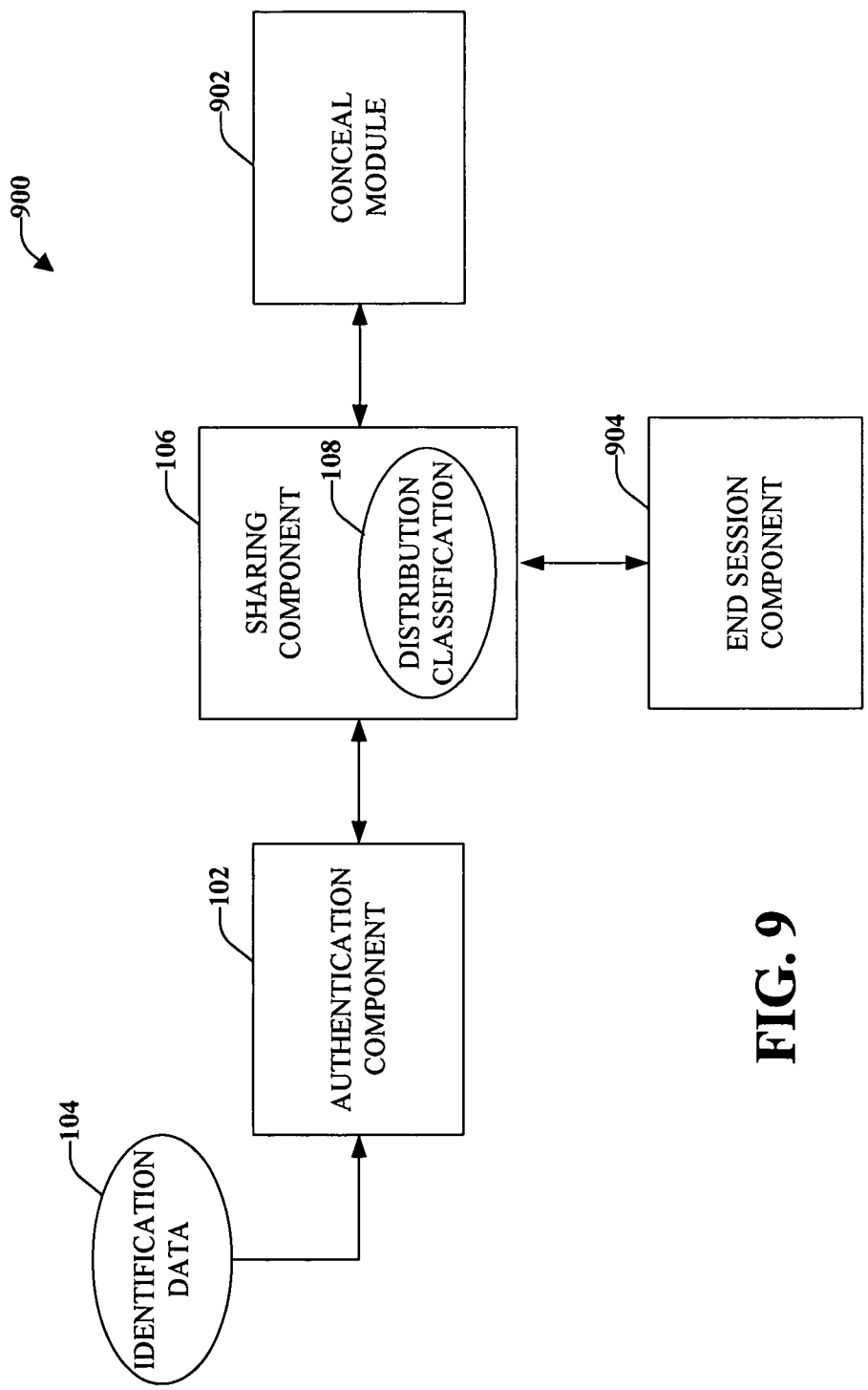
FIG. 9 illustrates a system for selectively obscuring or revealing at least a portion of data, according to an aspect.

FIG. 9 illustrates a system 900 for selectively obscuring or revealing at least a portion of data, according to an aspect. Various surface computing environments can be located in very public settings (e.g., hotel lobby, restaurant, tavern, hospital, university, office building, movie theater, library, coffee shop, and so forth). Due to the public nature of some environments, a user might desire to share information with one or more people while retaining the ability to quickly remove or hide that data if another person enters the vicinity or due to other reasons. Further, the user might desire to remove all personal or identifying data from the surface computing environment when the user is finished interacting with the surface computing environment (e.g., when the user leaves the area).

System 900 includes an authentication component 102 that allows the user to selectively authenticate or be identified by system 900. In accordance with some aspects, the user can choose to remain anonymous and not be identified while still being able to access some features associated with the surface computing environment. The surface computing environment can directly support various features (e.g., Internet access, ability to purchase items, and so forth). The features and access to the features can be specified by the entity providing the surface computing environment.

Also included in system 900 is a sharing component 106 that selectively allows information to be shared in the computing environment based on one or more distribution classifications 108. For example, a first subset of data might be freely shared within the surface computing environment (e.g., photos of a recent vacation) while other data might be kept confidential (e.g., business report).

A conceal module 902 is configured to selectively obscure at least a portion of the subset of data. A user can request that the subset of data be obscured or hidden though a gesture, direct input to a user interface (e.g., keyboard or mouse interaction), or based on other factors (e.g., touching the surface computing equipment). The subset of data can remain obscure until an instruction to reveal the portion of the subset of data is received by conceal module 902.

For example, a user can be preparing for an important meeting and is in a hotel lobby. While in that hotel lobby the user receives on their personal mobile device a lengthy document that needs to be reviewed before the meeting, which is imminent. If that user only has access to a small display screen on that user's mobile device, the user might decide to utilize a shared computing environment within the hotel lobby in order to quickly review the lengthy document and/or to share with others. In this situation, the user might feel that there is no choice but to utilize the potentially unsecure hotel lobby surface computing environment. Thus, though interaction with conceal module 902, the user is provided the appropriate control in order to quickly hide the document, as desired, if someone walks by. The user is then provided the control to redisplay the document after the "danger" passes.

Conceal module 902 can be configured to detect the presence of other people within the surface computing environment. Such detection can be made based upon the presence of sensors or other detection methods that can detect people and/or optionally identify those people (which can be facilitated in conjunction with authentication component 102). Based on the presence and/or identification of others, conceal module 902 can determine whether to hide information (or a subset of information) and/or whether to reveal information (or a subset thereof).

In accordance with some aspects, conceal module 902 utilizes biometrics in order to ascertain whether to hide and/or reveal a subset of information. For example, conceal module 902 can be configured to recognize a user's hand. When that user places her hand on the surface (e.g., table surface), conceal module 902 reveals information. However, when that user removes her hand from the surface, conceal module 902 automatically conceals the information (e.g., reduces a brightness level of the display by a certain percentage, such as 50%, 70%, 90%, or any other percentage). Since biometrics can be utilized according to some aspects, if a different person places his hand on the surface, conceal module 902 can recognize that it is some else's hand and might not change the viewing ability for a subset of information (e.g., takes no action to reveal/conceal information).

According to some aspects, a user can assign privacy ratings based on a numerical rating. For example, a "one" rating can indicate a first level of privacy, a rating of "two" can indicate a second level of privacy, a rating of "three" can indicate a third level of privacy and so forth. Based on these levels of privacy, conceal module 902 is configured to associate information displayed on a surface with a rating based on the number of fingers a user gestures with and/or places on the surface. Thus, if the user would like to assign a second level of privacy to the subset of information, the user places two fingers on the surface (or gestures with two fingers). In such a manner, conceal module 902 can selectively hide or reveal information as a function of the privacy level the user is indicating.

According to various aspects, conceal module 902 can hide/reveal information at an individual task level (e.g., a single photo, a single document, and so on), a multiple task level (e.g., multiple photos, a photo and a document, and so forth), or all information (e.g., an "everything" level). Thus, the user can selectively hide and/or reveal the desired information without disturbing other information that might be revealed (or disabled) in the surface computing environment.

In accordance with some aspects, conceal module 902 can selectively display information in such a manner that others within the surface computing environment cannot perceive or easily detect information that a user is entering within that environment. For example, the user is purchasing items and in order to pay for the items, the user is to enter a pin number, room number, credit card number, or other information into a keypad. Conventionally, the user would create a physical barrier with one hand, or stand directly in front of the keypad to mitigate others from detecting the code being entered. According to an aspect, conceal module 902 can provide the keypad on the surface temporarily in order to allow time for the code to be entered. In addition to entering the code, conceal module 902 might also require the user to place his hand near the keypad and detection of the side of his hand (which indicates the user is creating a physical barrier) can be needed in order for system 900 to accept the code.

In accordance with some aspects, conceal module 902 can arrange temporary keypad numbers in a random order, such that each time the numbers are displayed (e.g., to different users), the numbers are in different positions. Thus, when a user is entering the code, an observer cannot ascertain from the hand movement what keys are being pressed. Additionally or alternatively, conceal module 902 might not provide any visual and/or audio feedback (or all keys can have a similar sound). In another example, conceal module 902 can instruct the user to enter a changeable random number or a set of random numbers, then enter the accurate code, then another sequence of random numbers. The amount of random numbers before and after the real code can be changeable from zero random numbers up to any amount of random numbers so that observers cannot distinguish when the random number(s) end and the real code begins. The instruction for entry of random numbers can be unique for each user and or can be changed based on system 900 parameters. The instructions can be visual (e.g., "enter 3 random numbers, then enter your code") or can be based on a colored light sequence (e.g., green light indicates the "real" number should be entered and red light indicates that "fake" information should be entered). However, other techniques can be utilized by conceal module 902 to mitigate the chances of unauthorized persons learning the codes entered.

In accordance with some aspects, the user can utilize their personal mobile device to enter the code information and the personal mobile device interfaces with the surface. Thus, instead of displaying information on the surface display, the information is displayed on the mobile device. Through the mobile device, the surface (e.g., system 900) can instruct the user as to what should be entered and can confirm the entry of information.

In accordance with some aspects, system 900 includes an end session component 904 that is configured to end a session based upon a user request and/or based on other information, both intrinsic and extrinsic. The user can indicate that the session should be ended based upon a gesture. For example, the user can make a certain movement with a hand or arm and, based upon that predefined gesture, end session component 904 closes the session within a few seconds (e.g., 10 seconds, 5 seconds, 30 seconds, and so forth). End session component 904 can be configured to verify that information associated with the user is removed from the surface computing environment. The end session component 904 can determine that the session is to be ended and through its functionality instruct executing applications to close, wherein each executing application performs its respective function in order to end the session.

In accordance with some aspects, the user can indicate an end of session by pressing a button (e.g., physical button, button on a display screen, and so on) or by performing another action to indicate the current session should be ended. For example, the user can use the hand gesture of wiping off the content to be erased to indicate the current session should be ended. The end of session can be indicated by the user picking up an object, with which the user was authenticated with system (e.g., key fob, mobile device, RFID tag, and so forth). Based on this action, anything that was displayed on the surface computing environment that is private to the person ending the session is removed by end session component 904.

In accordance with some aspects, when two or more people have shared a computing environment and exposed each other to various types of information, the information that was transferred from one circle of trust to another (e.g., moved to a shared circle of trust), can remain in the surface computing environment since the user has committed to sharing that information. In accordance with some aspects, certain rights (e.g., Digital Rights Management) can be associated with the shared information, depending on the nature of the information.

End session component 904 can deal with privacy and confidentiality issues differently depending on the surface computing environment. Thus, end session component 904 can be context sensitive and can end the session differently depending on the context. For example, a group of people are in a public space, such as a hotel lobby and one person places their camera on the surface and, based on this contact, the camera shares selected photos with the surface. Thus, the photos are now on the surface, which is in a public space. End session component 904 can selectively end the session in this public space differently than the session would be ended if the surface is in a more private space, such as a home, personal office, etc., or in places where people are present based on an invitation (e.g., conference room).

In accordance with some aspects, when a user decides to leave a surface computing environment (e.g., end session), the user can physically pull (e.g., with a selection and drag function) information from a shared circle of trust to a private circle of trust. In such a matter, the user is enabled with a purposeful and specific user environment that allows the user to control the sharing of content. The information that is left behind in the surface computing environment, if any information is left behind, and what is not left behind can be clear and fully understandable by the user. In accordance with some aspects, end session module 904 can prompt the user by asking if particular information should be left behind. In accordance with some aspects, the user can establish preferences relating to whether certain information should be left behind or whether information should never be left behind. These preferences can allow system 900 to automatically remove information as a function of the pre-established user preferences.

Figure 10:
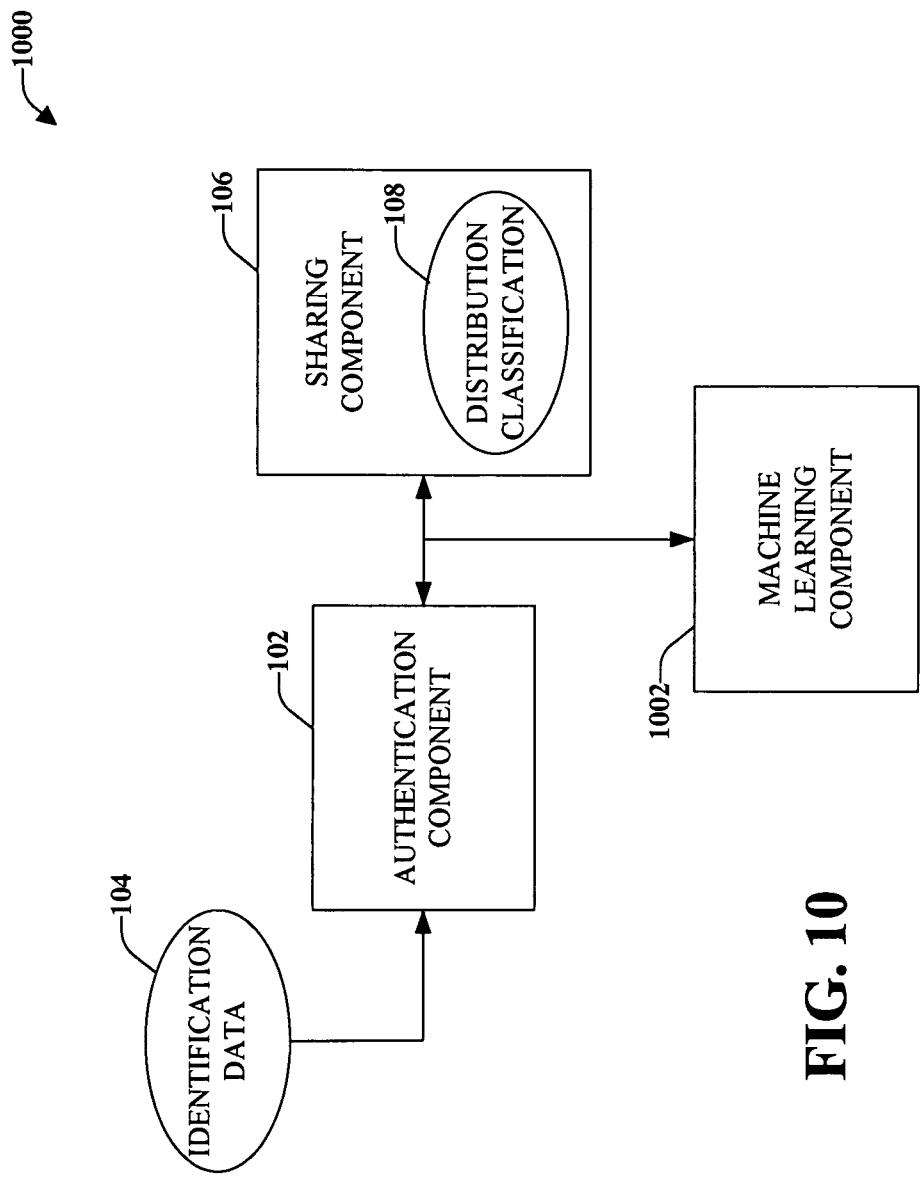
FIG. 10 illustrates a system that facilitates authentication and selective sharing of data in a surface computing environment in accordance with the various aspects described herein.

FIG. 10 illustrates a system 1000 that facilitates authentication and selective sharing of data in a surface computing environment in accordance with the various aspects described herein. System 1000 includes an authentication component 102 that conveys user identification data 104 to a sharing component 106. Based on the user identification data 104 and distribution classifications 108, user information is selectively shared with one or more other users in a surface computing environment.

Also included in system 1000 is a machine learning component 1002 that is configured to automate one or more features in accordance with the disclosed aspects. The automation provided by machine learning component 1002 can be facilitated by artificial intelligence, rules based logic, machine learning and reasoning, and so forth.

For example, the various aspects (e.g., in connection with authenticating and/or selectively share information) can employ various artificial intelligence-based schemes for carrying out various aspects thereof. Artificial intelligence based systems (e.g., explicitly and/or implicitly trained classifiers) can be employed in connection with performing inference and/or probabilistic determinations and/or statistical-based determinations as in accordance with one or more aspects as described herein. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects.

For example, a process for ascertaining the identification of a particular user and/or selectively distributing information within a surface computing environment can be facilitated through an automatic classifier system and process. Moreover, where multiple types of information, sources of information and distribution classifications are employed having the same or similar information, the classifier can be employed to determine which distribution classification to employ in a particular situation.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of distribution classifications, for example, attributes can be words or phrases or other data-specific attributes derived from the words (e.g., the presence of key terms), and the classes are categories or areas of interest (e.g., levels of trust).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to identify a user, which information to retain as private, and so forth.

In accordance with an alternate aspect, an implementation scheme (e.g., rule) can be applied to control and/or regulate distribution of information in a surface computing environment. It will be appreciated that the rules-based implementation can automatically and/or dynamically regulate authentication (e.g. user identification) and distribution of information based upon a predefined criterion. In response thereto, the rule-based implementation can grant and/or deny access to information by employing a predefined and/or programmed rule(s) based upon any desired criteria (e.g., data type, data size, data importance, database owner, caller identity . . . ).

By way of example, a user can establish a rule that can require a trustworthy flag and/or certificate to distributed a predefined type of information whereas, authentication and/or distribution of other information within a particular surface computing environment may not require such security credentials. It is to be appreciated that any preference can be facilitated through pre-defined or pre-programmed in the form of a rule.

In view of the exemplary systems shown and described, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 11:
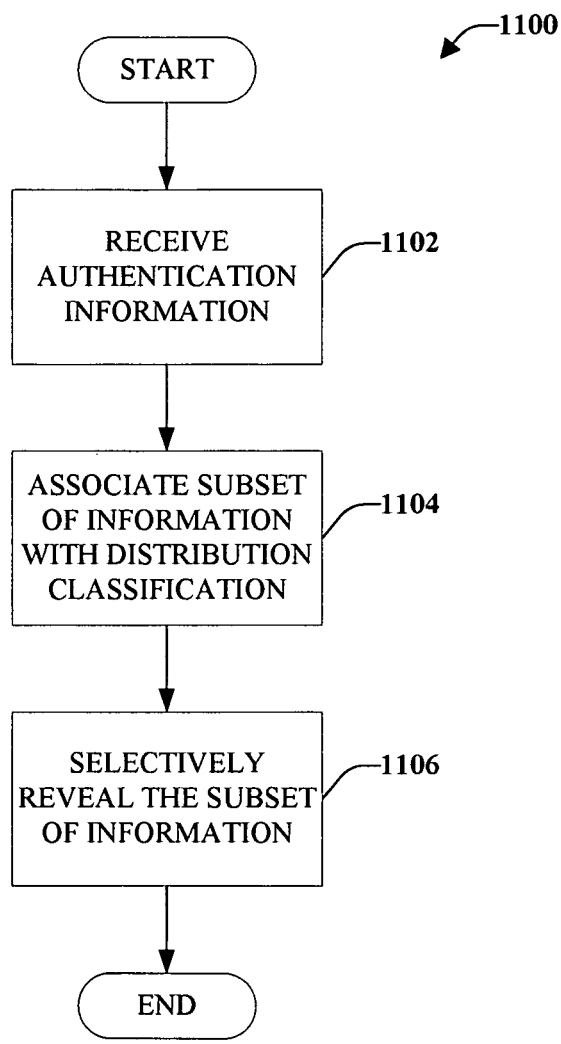
FIG. 11 illustrates a method for sharing information within a surface computing environment, according to an aspect.

FIG. 11 illustrates a method 1100 for sharing information within a surface computing environment, according to an aspect. In a surface computing environment, many surfaces can provide computing capabilities. For example, a table or a wall can be transformed into a display or screen, which can operate in a manner similar to a touch-screen device (e.g., with the use of cameras to track a user's movements and/or interactions with the surface). When the table, wall, or other surface is transformed into a surface, a multitude of users can have access to the information presented (e.g., viewing capabilities, ability to interact with the computing surface, and so on). Allowing others to have access to the data can be a concern especially if the data was not intended for consumption by others. Thus, personal data that should not be disseminated, data that should only be perceived by a few selected individuals, and so forth, can be compromised in a surface computing environment if safeguards are not utilized. In order to mitigate data being compromised, method 1100 is configured to identify a user and allow that user to categorize information that is to be rendered on a computing surface. Such categories can specify data that is for common consumption (e.g., all individuals in the surface computing environment have access to the data), for private consumption (e.g., data remains private and is not able to be perceived by others in the surface computing environment), or any state in between (e.g., data is available for a select subset of people, a subset of the available data is presented while another subset is not presented, a subset of data is selectively presented, and so on).

When a user arrives at a public kiosk or public surfacing computers with internet access, that user has an identity that can be validated to enable the user to gain access to some personal information, such as through the internet. In such a manner, the user is not required to have their device in order to leverage this scenario.

For example, the user arrives at a public surface environment, such as a surface computing table-like setting where three or four people can sit around a surface computing enabled table. The user can place their mobile device (e.g., cellular phone, laptop, and so forth), a key fob attached to their car keys, or any other object (e.g., smart card, employee identification) in contact with the surface equipment. At substantially the same time as the object is detected by the surface, a first circle of trust can open and allow the user to make a choice whether the user wants to authenticate with system or would prefer to remain anonymous.

The user might decide to allow system to know their identity. Thus, a first level of trust can provide services and scenarios specific to that user (e.g., a punch card with five cups of coffee punched and the sixth cup of coffee is free). In an example, the user can take their business card from their personal information circle of trust (e.g., information that should not be left behind at the end of the session) and drag the business card out to another circle of trust. In another example, if a colleague arrives and interacts with the surface table, information that is to be shared with this colleague can be dragged from one circle of trust to another circle of trust in order to allow the sharing of information. Thus, the most private circle of trust can be selectively broadened in order to interact with others. The broadening can be performed as a seamless, but noticeable activity. When the user moves information from the private circle of trust, there are user experience events that occur to indicate that the information is leaving a private domain or secure area or that someone is trying to enter the private circle of trust and whether that person should be allowed to enter.

Method 1100 starts, at 1102, when a user authenticates with a surface computing environment. The user can authenticate based on a manual entry of information (e.g., user name, email alias, identification card number, and so forth). In another example, the user can authenticate through use of an object that was previously associated with the user based on the user's request (e.g., key fob, user device, RFID tag, and so on). In accordance with some aspects, the user can authenticate though the use of biometrics, if the user has authorized such use. Based on various parameters that can be defined by the user and/or the surface computing environment, more than one manner of identification might be necessary in order for the user to authenticate with the surface computing environment. This dual authentication can provide an extra layer of security and can be a function of a user request and/or parameters associated with the surface computing environment.

In accordance with some aspects, the user might not desire to authenticate with the surface computing environment but prefers to utilize the surface computing environment in an anonymous manner. In this situation no information associated with the user is enabled. Therefore, there are no documents, pictures, or other electronically retained data associated with that user displayed on surface equipment and/or otherwise shared within the surface environment.

If the user authenticates, at 1104, one or more subsets of information are associated with a distribution classification. In accordance with some aspects, all information is associated with one or more distribution classifications and information that is not assigned to a distribution classification is automatically assigned to a secure or confidential classification (e.g., non-public circle of trust). The distribution classification can be circles of trust wherein the user can easily perceive the information (or subsets thereof) that are contained in each circle. For example, the circles and information contained therein can be displayed on a device associated with the user (that is separate from the surface computing environment). In accordance with some aspects, the circles and information contained therein are displayed within the surface computing environment (e.g., on a tabletop display) wherein only the user can view the information.

Based on the distribution classification, one or more subsets of information are selectively shared, at 1106, within the surface computing environment. In an example, two friends are in the surface computing environment and are authenticated through respective devices. The distribution classifications can be defined such that the devices automatically recognize each other and share information since the devices recognize each other as trusted devices. It should be noted that these devices were previously associated (e.g., based on a user instruction).

In another example, a subset of information might be selectively shared with certain individuals that are identified through various manners (e.g., name, device identification, a commonality, and so forth). For example, an employee might be in an airport lounge waiting for a flight. While in that lounge, the employee might desire to share information with others in the same company that might pass through that airplane lounge during the same day. The employee might not know who from the company will be passing through that airplane lounge, thus email is not sufficient. In such a manner, the employee can set up a social network within the surface computing environment. When people that can be authenticated in that social network (e.g., common employer) are identified, the information left by the employee is provided to these people. In accordance with some aspects, the various employees can participate in the social network and share information though a common circle of trust.

Figure 12:
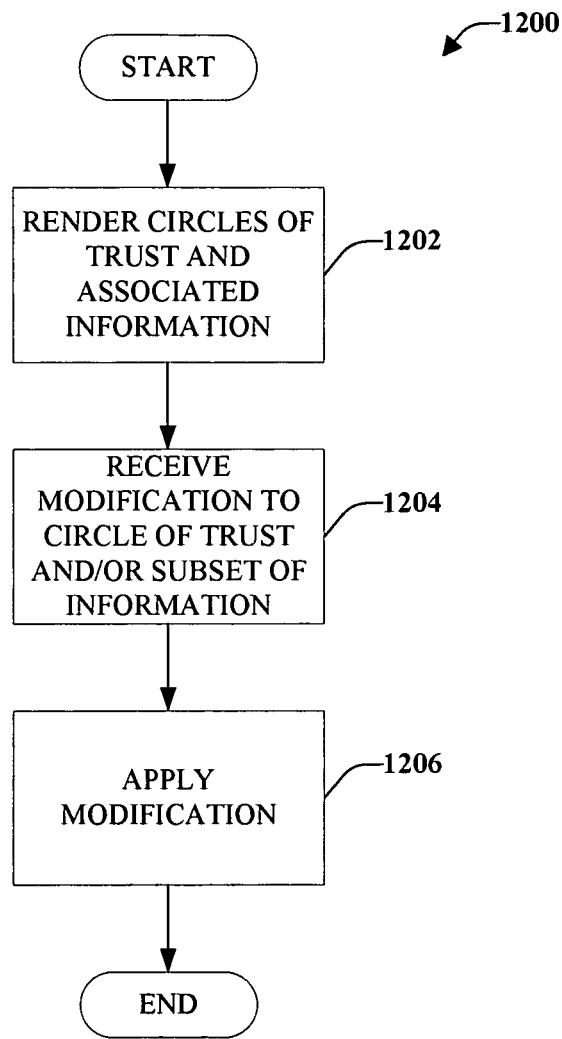
FIG. 12 illustrates a method for classifying or reclassifying data among different levels of trust, according to an aspect, wherein the sharing of information is a function of the levels of trust.

FIG. 12 illustrates a method 1200 for classifying or reclassifying data among different levels of trust, according to an aspect, wherein the sharing of information is a function of the levels of trust. Through utilization of circles of trust, when a user is in a public computing experience, such as a surface computing scenario, the user can visually detect how information is being shared with others in the environment.

At 1202, circles of trust and associated information are rendered (e.g., presented) within a surface computing environment and/or a device (e.g., personal mobile device) within the surface computing environment.

After perceiving this information, the user might decide that one or more subsets of information should be in a different circle of trust. For example, a subset of information might be desired to be moved from a quasi-public circle of trust to a private circle of trust because the user no longer wishes to share the information. In another example, the user might desire to selectively make public some information that was previously classified as personal. Thus, at 1204, a modification to one or more subsets of information and/or circle of trust is received. The modification can be a verbal command, the user selecting information (e.g., data, files, pictures, and so forth) and moving that information to a different circle of trust, and/or based on other user interaction (e.g., a gesture).

At 1206, the modification is applied. In accordance with some aspects, prior to applying the modification a query is sent to the user asking the user to verify the modification. In accordance with some aspects, when the user plans to leave the surface computing environment, the user might move all items to a private circle of trust to further secure the information (e.g., no residual information remains in the surface computing environment).

For example, if a user carries a personal mobile device into a surface computing environment, the presence of the mobile device might create a circle of trust, such as a personal circle of trust. The user can select one or more subsets of information from within that personal circle of trust and share the one or more subsets of information with one or more other users within the surface computing environment.

Figure 13:
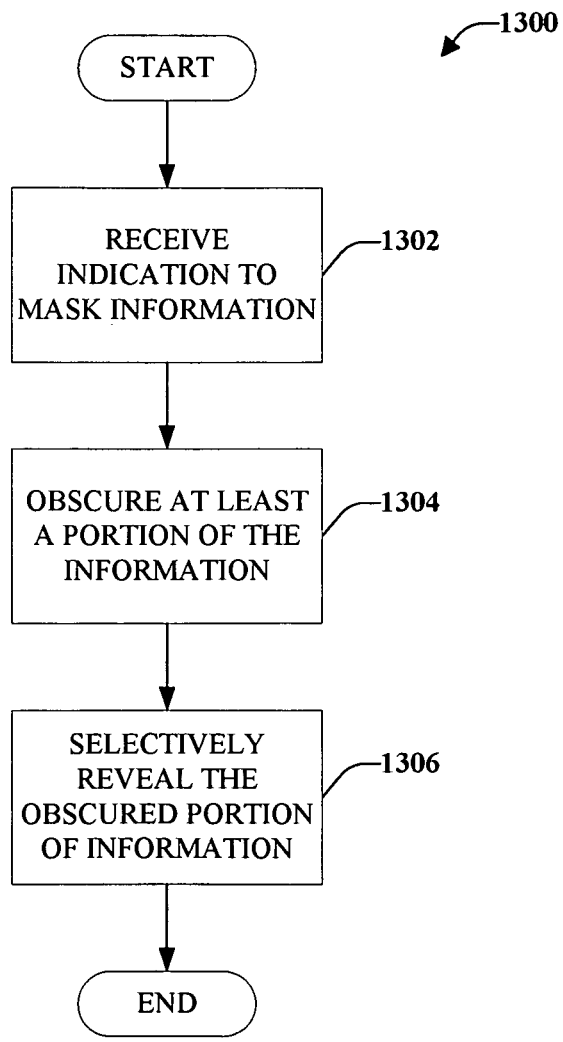
FIG. 13 illustrates a method for quickly masking or reveling information in a surface computing environment according to various aspects.

FIG. 13 illustrates a method 1300 for quickly masking or reveling information in a surface computing environment according to various aspects. At 1302, an indication is received to mask at least a subset of information that is rendered in a surface computing environment. The indication can be received in various forms, including a gesture, a direct manual input, a verbal command, and so forth. For example, when a user or multiple users are interacting in a surface computing environment there might be a situation that develops wherein the one or more users do not want to compromise the shared information. For example, the users can be interacting with the surface and a person that should not have access to the information enters the room. The presence of the person can be automatically detected and/or detected by the user and the request to obscure the information is manually entered.

Based on the indication, at 1304, at least a portion of the subset of information is obscured. Obscuring the portion of information can include blanking out an area of a surface where that portion of information is located. In accordance with some aspects, obscuring the portion of information can include reducing a light source associated with that portion of information and/or covering the information with other information or with a blank document or a blank screen, for example. The portion of information can remain obscured until an indication to reveal the information is received, at 1306.

Figure 14:
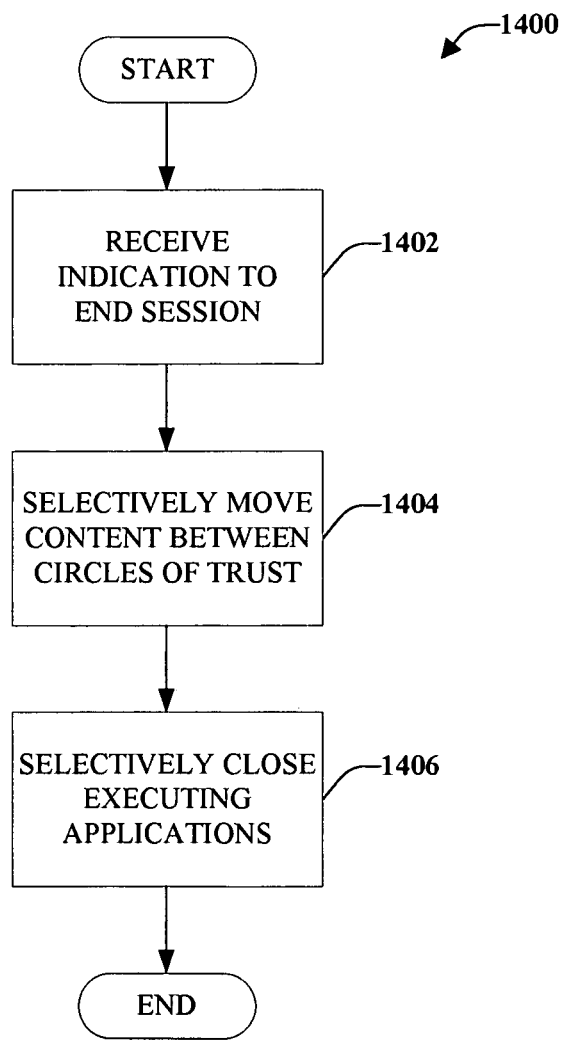
FIG. 14 illustrates a method for removing information from a surface computing environment, according to an aspect.

FIG. 14 illustrates a method 1400 for removing information from a surface computing environment, according to an aspect. Method 1400 can be configured to end a session based on a user request to end the session, based on intrinsic information, and/or based on extrinsic information. At 1402, an indication to end a session is received. This indication can be received from the user (e.g., detected gesture, received key strokes, removal of a personal object from a surface computing environment, and so forth). In accordance with some aspects, the indication is based on information related to the location of the user. For example, the indication can be that the user has exited the surface computing environment (e.g., the user is no longer in the vicinity of the surface computing equipment).

As a function of the received indication, at 1404, content is selectively moved from a public or quasi-public circle of trust to a private circle of trust. In accordance with some aspects, the selective movement of content can be based on the location of the surface computing equipment. For example, if the equipment is located in the user's house (e.g., living room), the content might not be moved or only a subset of content might be moved. However, if the surface computing environment is in a public space, all content might be moved to a private circle of trust.

According to some aspects, when two or more people have shared a computing environment and exposed each other to various types of information, the information that was transferred from one circle of trust to another can remain in the surface computing environment since the user has committed to sharing that information. In accordance with some aspects, certain rights (e.g., Digital Rights Management) can be associated with the shared information, depending on the nature of the information.

Additionally or alternatively, at 1406, applications, associated with the session that is to be ended, are selectively closed. For example, executing applications can be instructed to close, wherein such applications perform respective functions to close the session. If some applications are utilized by other people remaining in the surface computing environment, those application might not close.

Thus, method 1400 allows a user to remove personal or identifying data from the surface computing environment when that user is finished interacting with the surface computing environment. According to some aspects, an indication (e.g., text message or other confirmation) can be provided to the user to notify the user that the session has been closed.

Figure 15:
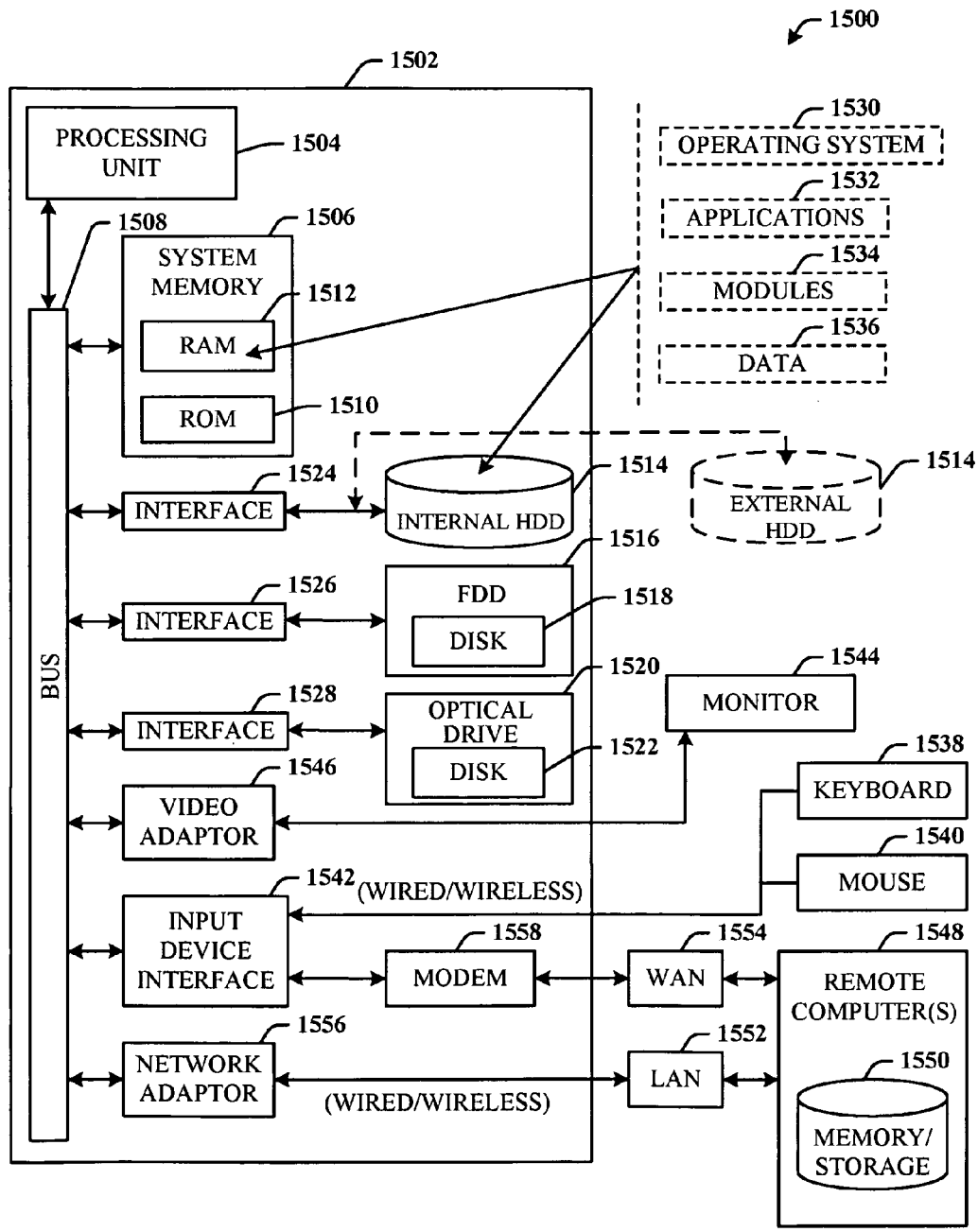
FIG. 15 illustrates a block diagram of a computer operable to execute the disclosed aspects.

Referring now to FIG. 15, illustrated is a block diagram of a computer operable to execute the disclosed aspects. In order to provide additional context for the various aspects disclosed herein, FIG. 15 and the following discussion are intended to provide a brief, general description of a suitable computing environment 1500 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the various aspects can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 through an interface, such as a video adapter 1546. In addition to the monitor 1544, a computer typically includes other peripheral output devices (not shown), such as speakers, printers, etc.

The computer 1502 may operate in a networked environment using logical connections through wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 through the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
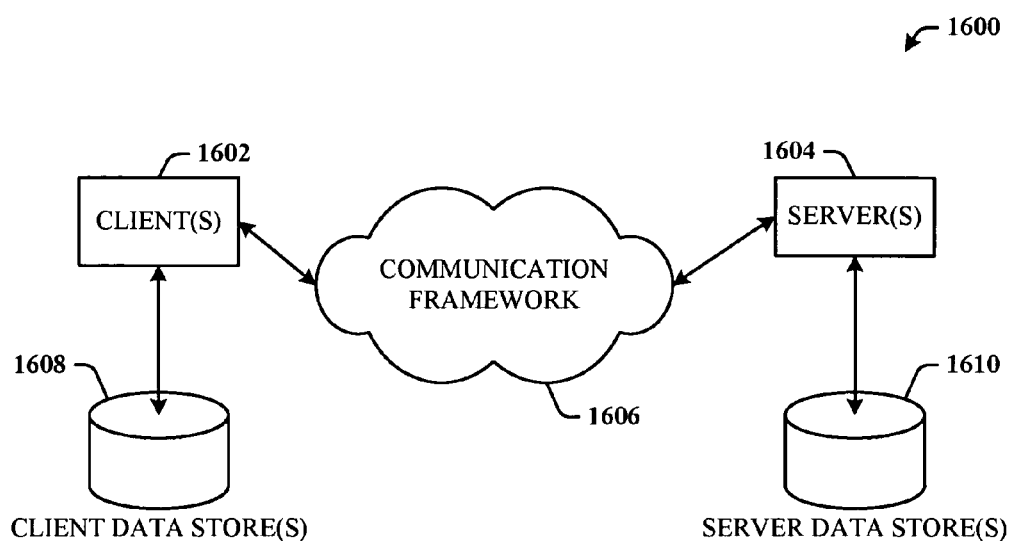
FIG. 16 illustrates a schematic block diagram of an exemplary computing environment in accordance with the various aspects.

Referring now to FIG. 16, illustrated is a schematic block diagram of an exemplary computing environment 1600 in accordance with the various aspects. The system 1600 includes one or more client(s) 1602. The client(s) 1602 can be hardware and/or software (e.g., threads, processes, computing devices). The client(s) 1602 can house cookie(s) and/or associated contextual information by employing the various aspects, for example.

The system 1600 also includes one or more server(s) 1604. The server(s) 1604 can also be hardware and/or software (e.g., threads, processes, computing devices). The servers 1604 can house threads to perform transformations by employing the various aspects, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated through a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system comprising:
an authentication component that identifies a user based on an interaction with a surface computing environment;
a sharing component that reveals a subset of information within the surface computing environment, the subset of information revealed is a function of the user identification and a distribution classification; and
a conceal module, executed by a processor, to temporarily obscure at least a portion of the subset information having been revealed within the surface computing environment, in response to receiving an indication to obscure revealed information.

2. The system of claim 1, wherein the distribution classification is based on confidentiality levels established by the user, automatically assigned based on inferred data, or combinations thereof.

3. The system of claim 1, further comprising a merge module that selectively reclassifies a segment of information within the distribution classification.

4. The system of claim 3, wherein the merge module is further configured to reclassify the segment of information when the user moves the segment of information from a first circle of trust to a second circle of trust, and wherein the segment of information and the first and second circles of trust are displayed within the surface computing environment.

5. The system of claim 1, wherein the interaction with the surface computing environment is a manual data entry, a biometric input, a detected presence of an identifiable object, or combinations thereof.

6. The system of claim 1, wherein the subset of information revealed is public information accessible by all users within the surface computing environment.

7. The system of claim 1, wherein the subset of information revealed is personal information accessible by one or more identified users within the surface computing environment.

8. The system of claim 1, wherein the conceal module is further configured to automatically obscure the portion of the subset of information having been revealed within the surface computing environment, in response to detecting an unauthorized user within the surface computing environment.

9. The system of claim 1, wherein the authentication component allows the user to decline the identification, and wherein the sharing component does not reveal information associated with the user when the user declines the identification with the authentication component.

10. The system of claim 1, wherein the sharing component reveals the subset of information as a function of a presence of a user having a selected commonality with other users within the surface computing environment.

11. A method comprising:
identifying a presence of a user in a surface computing environment;
allowing the identified user to choose to authenticate;
revealing at least a subset of information when the identified user is authenticated;
receiving an indication to mask a portion of the revealed subset of information; and
temporarily obscuring, by a processor, the portion of the revealed subset of information based on the received indication to mask revealed information.

12. The method of claim 11, further comprising:
rendering distribution classifications and associated information to the authenticated user;
receiving a modification to a first distribution classification, associated information, or combinations thereof; and
applying the received modification.

13. The method of claim 12, wherein the received modification is a selection of the first distribution classification, or a movement of the first distribution classification to a second distribution classification.

14. The method of claim 11, wherein a presence of the user is identified by a manual data entry, a biometric input, a detected presence of an identifiable object, or combinations thereof.

15. The method of claim 11, wherein the portion of the revealed subset of information is obscured until a request to reveal the obscured information is received.

16. The method of claim 11, wherein the indication to mask the portion of the revealed subset of information is automatically received in response to a detection of an unauthorized user within the surface computing environment.

17. A method comprising:
selectively authenticating a user at a beginning of a session with a surface computing environment;
revealing information associated with the authenticated user as a function of an assignment of the information to one or more security levels;
enabling modifications to the assignment of information to the one or more security levels; and
temporarily concealing, by a processor, the revealed information associated with the authenticated user in response to receiving an indication to conceal revealed information.

18. The method of claim 17, wherein the indication to conceal information is automatically generated in response to detecting an unauthorized user within the surface computing environment.

19. The method of claim 18, further comprising again revealing the concealed information associated with the authenticated user, in response to detecting no unauthorized users within the surface computing environment.

20. The method of claim 16, further comprising again revealing the obscured information, in response to detecting no unauthorized users within the surface computing environment.

* * * * *